(12) United States Patent
Pang et al.

(10) Patent No.: US 10,161,311 B2
(45) Date of Patent: Dec. 25, 2018

(54) AIRCRAFT WITH INJECTION COOLING SYSTEM AND INJECTION COOLING SYSTEM

(71) Applicant: General Electric Company, Schenectady, NY (US)

(72) Inventors: Qiang Pang, Shanghai (CN); Guohua Zhong, Shanghai (CN); Yao Li, Shanghai (CN)

(73) Assignee: General Electric Company, Schenectady, NY (US)

( * ) Notice: Subject to any disclaimer, the term of this patent is extended or adjusted under 35 U.S.C. 154(b) by 351 days.

(21) Appl. No.: 15/104,479

(22) PCT Filed: Dec. 23, 2013

(86) PCT No.: PCT/CN2013/090219
§ 371 (c)(1),
(2) Date: Jun. 14, 2016

(87) PCT Pub. No.: WO2015/096000
PCT Pub. Date: Jul. 2, 2015

(65) Prior Publication Data
US 2017/0342905 A1    Nov. 30, 2017

(51) Int. Cl.
*F02C 7/18* (2006.01)
*F02K 1/70* (2006.01)
(Continued)

(52) U.S. Cl.
CPC .............. *F02C 7/185* (2013.01); *B64D 27/16* (2013.01); *B64D 29/00* (2013.01); *F02C 6/08* (2013.01);
(Continued)

(58) Field of Classification Search
CPC .... F02C 6/08; F02C 7/12; F02C 7/185; F02K 1/70; F02K 1/72; F02K 1/766; B64D 29/00
See application file for complete search history.

(56) References Cited

U.S. PATENT DOCUMENTS 3,024,771 A    3/1962    Criffield et al.
3,598,319 A    8/1971    Howald et al.
(Continued)

FOREIGN PATENT DOCUMENTS

CA    2592911 A1    1/2008
CN    102536513 A   7/2012
(Continued)

OTHER PUBLICATIONS

Japanese Search Report issued in connection with corresponding JP Application No. 2016-539191 dated Apr. 26, 2017.
(Continued)

*Primary Examiner* — Carlos A Rivera
*Assistant Examiner* — Thuyhang Nguyen
(74) *Attorney, Agent, or Firm* — General Electric Company; William Andes

(57) ABSTRACT

An aircraft with a turbofan engine assembly having at least one compressor, a nacelle surrounding the turbine engine and defining an annular bypass duct between the nacelle and the turbine engine, a thrust reverser having at least one moveable control surface, a thrust reverser locking system configured to selectively lock the thrust reverser and an injection cooling system.

15 Claims, 6 Drawing Sheets

(51) Int. Cl.
  *F02K 1/72* (2006.01)
  *F02K 1/76* (2006.01)
  *F02C 6/08* (2006.01)
  *B64D 27/16* (2006.01)
  *B64D 29/00* (2006.01)
  *F02K 3/06* (2006.01)

(52) U.S. Cl.
  CPC .............. *F02C 7/18* (2013.01); *F02K 1/70* (2013.01); *F02K 1/72* (2013.01); *F02K 1/766* (2013.01); *F02K 3/06* (2013.01); *F05D 2220/323* (2013.01); *F05D 2260/20* (2013.01); *F05D 2260/232* (2013.01); *Y02T 50/676* (2013.01)

(56) References Cited

U.S. PATENT DOCUMENTS

| | | | |
|---|---|---|---|
| 4,383,647 | A | 5/1983 | Woodruff et al. |
| 4,482,114 | A | 11/1984 | Gupta et al. |
| 5,553,449 | A | 9/1996 | Rodgers et al. |
| 5,704,218 | A | 1/1998 | Christians et al. |
| 5,974,783 | A | 11/1999 | Gonidec et al. |
| 8,713,911 | B2 | 5/2014 | Kopecek et al. |
| 2008/0245926 | A1 | 10/2008 | Journade et al. |
| 2009/0288386 | A1 | 11/2009 | Marshall et al. |
| 2009/0314004 | A1 | 12/2009 | Van Der Woude |
| 2012/0318380 | A1 | 12/2012 | Mer et al. |
| 2013/0164115 | A1* | 6/2013 | Sennoun ............. F02C 7/185 415/1 |
| 2015/0252683 | A1 | 9/2015 | Hasting et al. |
| 2015/0369171 | A1* | 12/2015 | Papa ................. F02K 1/76 60/226.2 |

FOREIGN PATENT DOCUMENTS

| | | |
|---|---|---|
| DE | 2718643 A1 | 11/1977 |
| EP | 0801221 A2 | 10/1997 |
| FR | 1 291 936 A | 4/1962 |
| JP | S48-018799 B1 | 6/1973 |
| JP | S57-099251 A | 6/1982 |
| JP | H05-252694 A | 9/1993 |
| JP | H09-506952 A | 7/1997 |
| JP | H10-196456 A | 7/1998 |
| JP | 2001-515424 A | 9/2001 |
| JP | 2009-509844 A | 3/2009 |
| JP | 2009-510314 A | 3/2009 |
| JP | 2013-127247 A | 6/2013 |

OTHER PUBLICATIONS

Notification of Reasons for Refusal issued in connection with corresponding JP Application No. 2016-539191 dated May 9, 2017.
Decision to Grant issued in connection with corresponding JP Application No. 2016-539191 dated Jun. 13, 2017.
Extended European Search Report and Opinion issued in connection with corresponding EP Application No. 13900053.3 dated Jun. 20, 2017.
Unofficial English Translation of Chinese Office Action issued in connection with corresponding CN Application No. 201380081836.2 dated Dec. 29, 2016.
International Search Report and Written Opinion issued in connection with corresponding Application No. PCT/CN2013/090219 dated Sep. 9, 2014.

* cited by examiner

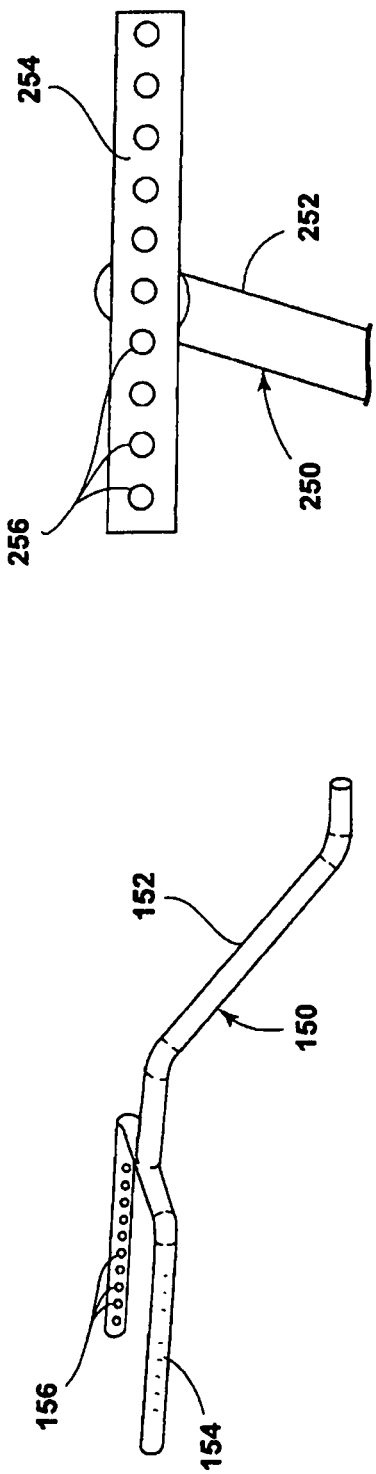
FIG. 6A
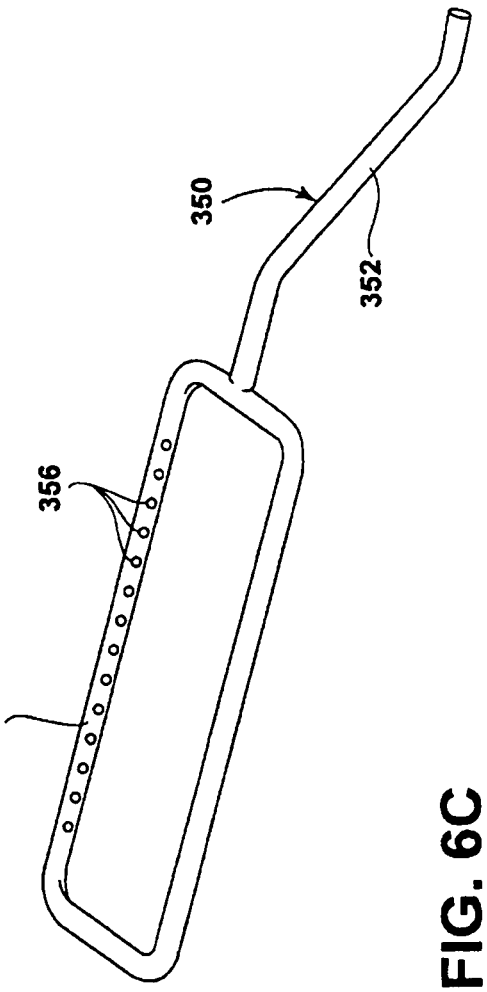
FIG. 6B
FIG. 6C

AIRCRAFT WITH INJECTION COOLING SYSTEM AND INJECTION COOLING SYSTEM

BACKGROUND

Contemporary aircraft engines may include a thrust reverser system to assist in reducing the aircraft speed during landing. Typical thrust reversers include a movable element that when in the active position reverses at least a portion of the airflow passing through the engine. Contemporary aircraft may also feature a thrust reverser locking system to lock the thrust reverser into position. The thrust reverser locking system may be exposed to high temperatures, which may exceed its environmental limitation.

BRIEF DESCRIPTION

In one aspect, an embodiment of the innovation relates to an aircraft having a turbofan engine assembly which has a turbine engine having at least one compressor, a thrust reverser having at least one movable control surface, movable to and from a reversing position, a thrust reverser locking system operably coupled to the thrust reverser and configured to selectively lock the thrust reverser, a bleed air system having a pre-cooler fluidly coupled to the at least one compressor of the turbine engine to bleed air from the at least one compressor and cool the bleed air, and an injection cooling system fluidly coupled to the thrust reverser locking system and the pre-cooler and configured to transfer hot ambient air from the thrust reverser locking system to the pre-cooler.

In another aspect, an embodiment of the innovation relates to an injection cooling system for cooling a thrust reverser locking system of a jet engine assembly in an aircraft having a bleed air system having a pre-cooler fluidly coupled the turbine engine to bleed air from the turbine engine and cool the bleed air and having an air supply duct fluidly coupling the thrust reverser locking system to the pre-cooler and configured to supply ambient air from the thrust reverser locking system to the pre-cooler to cool the thrust reverser locking system.

BRIEF DESCRIPTION OF THE DRAWINGS

In the drawings:

FIG. 6A is a schematic view of the injection tube of the injection cooling system of FIG. 5.

FIG. 6B is an alternative injection tube according to various aspects described herein.

FIG. 6C is a schematic view of yet another alternative injection tube according to various aspects described herein.

DETAILED DESCRIPTION

Figure 1:
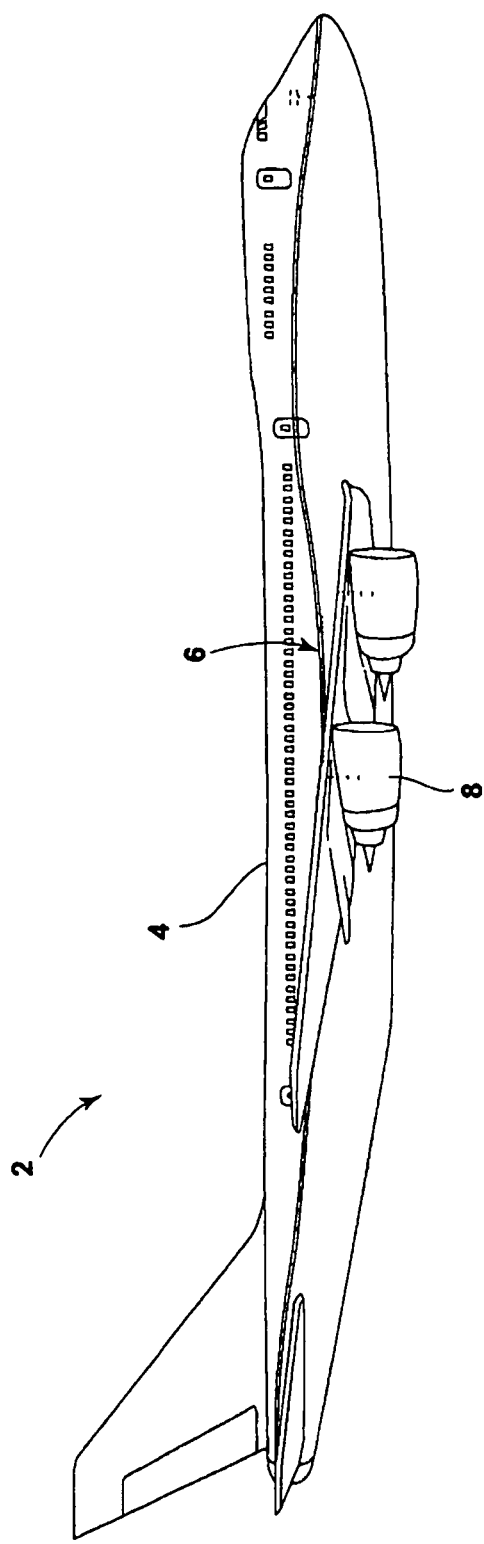
FIG. 1 is a side view of an aircraft with multiple engine assemblies.

FIG. 1 illustrates an aircraft 2 having a fuselage 4 with wing assemblies 6 extending outward from the fuselage 4. One or more turbofan jet engine assemblies 8 may be coupled to the aircraft 2 to provide propulsion therefore. A pylon 10 (more clearly illustrated in FIG. 3) may be configured for securing one of the jet engine assemblies 8 to a portion of the aircraft 2. In the illustrated example, each jet assembly 8 is operably coupled to a wing assembly 6. While a commercial aircraft 2 has been illustrated, it is contemplated that embodiments of the innovation may be used in any type of aircraft, for example, without limitation, fixed-wing, rotating-wing, rocket, personal aircraft, and military aircraft.

Figure 2:
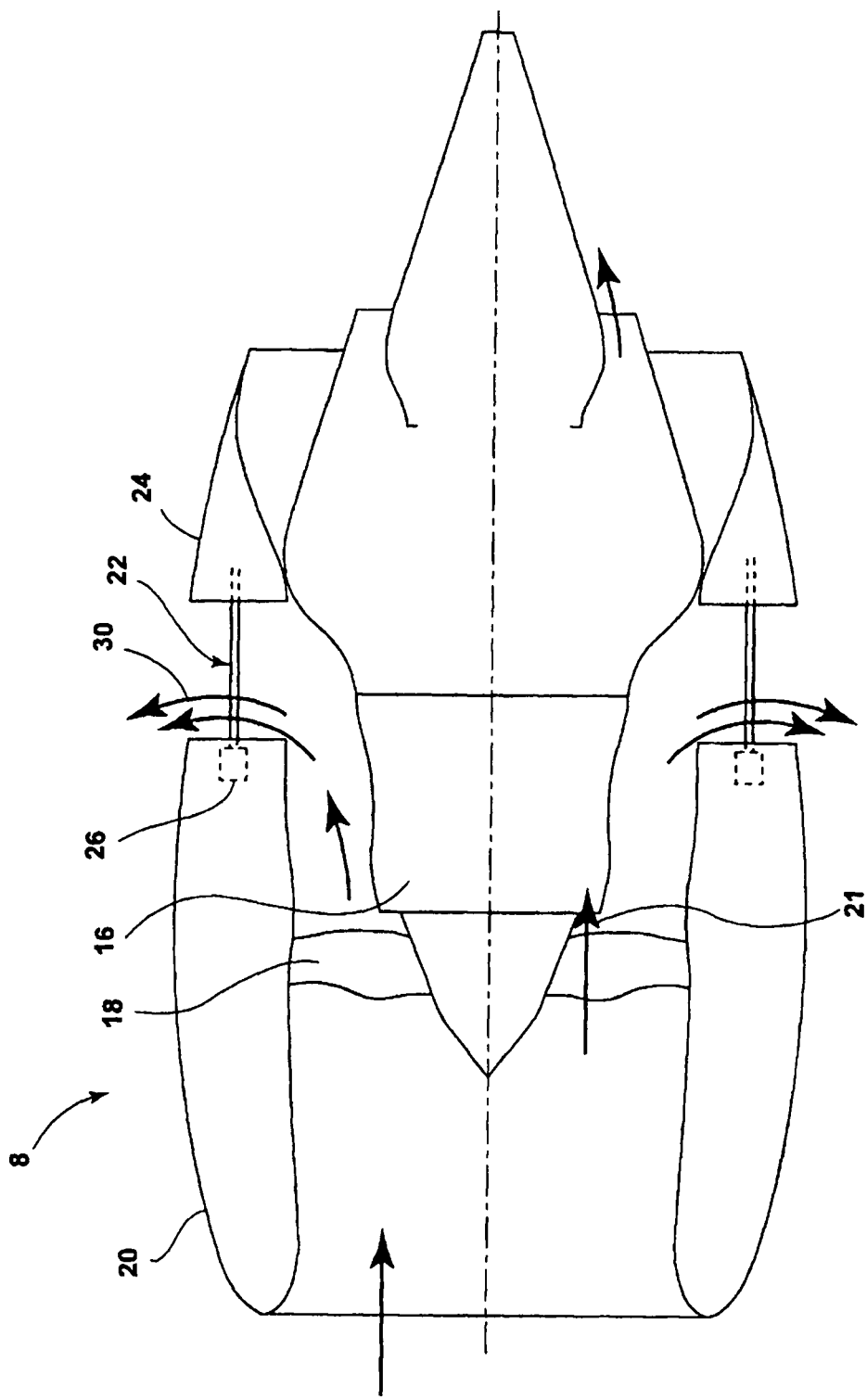
FIG. 2 is a schematic view of a portion of a turbofan jet engine assembly with a thrust reverser, which may be included in the aircraft of FIG. 1.

As illustrated more clearly in FIG. 2, each turbofan jet engine assembly 8 may include a turbine engine 16, a fan assembly 18, and a nacelle 20. Portions of the nacelle 20 have been cut away for clarity. The nacelle 20 surrounds the turbine engine 16 and defines an annular airflow path or annular bypass duct through the turbofan jet engine assembly 8 to define a generally forward-to-aft bypass airflow path as illustrated by the arrows 21.

A thrust reverser with at least one movable element, which is movable to and from a reversing position, may be used to change the direction of the bypass airflow. In the reversing position, the movable element may be configured to reverse at least a portion of the bypass airflow. There are several methods of obtaining reverse thrust on turbofan jet engine assemblies 8. For exemplary purposes, one example of a thrust reverser 22 that may be used in the turbofan jet engine assembly 8 has been illustrated. The thrust reverser 22 includes at least one moveable control surface or movable element 24. The movable element 24 has been illustrated as a slidable portion of an outer cowling that is capable of axial motion with respect to the forward portion of the nacelle 20. A hydraulic actuator 26 may be coupled to the movable element 24 to move the movable element 24 into and out of the reversing position. In the reversing position, as illustrated, the movable element 24 limits the annular bypass area between the movable element 24 and the turbine engine 16, it also opens up a portion between the movable element 24 and the forward portion of the nacelle 20 such that the air flow path may be reversed as illustrated by the arrows 30. An optional deflector or flap may be included to aid in directing the airflow path between the movable element 24 and the forward portion of the nacelle 20. The thrust reverser 22 changes the direction of the thrust force by reversing at least a portion of the bypass airflow. It will be understood that any number of multiple actuators may be utilized to move the moveable element into the reversing position.

Figure 3:
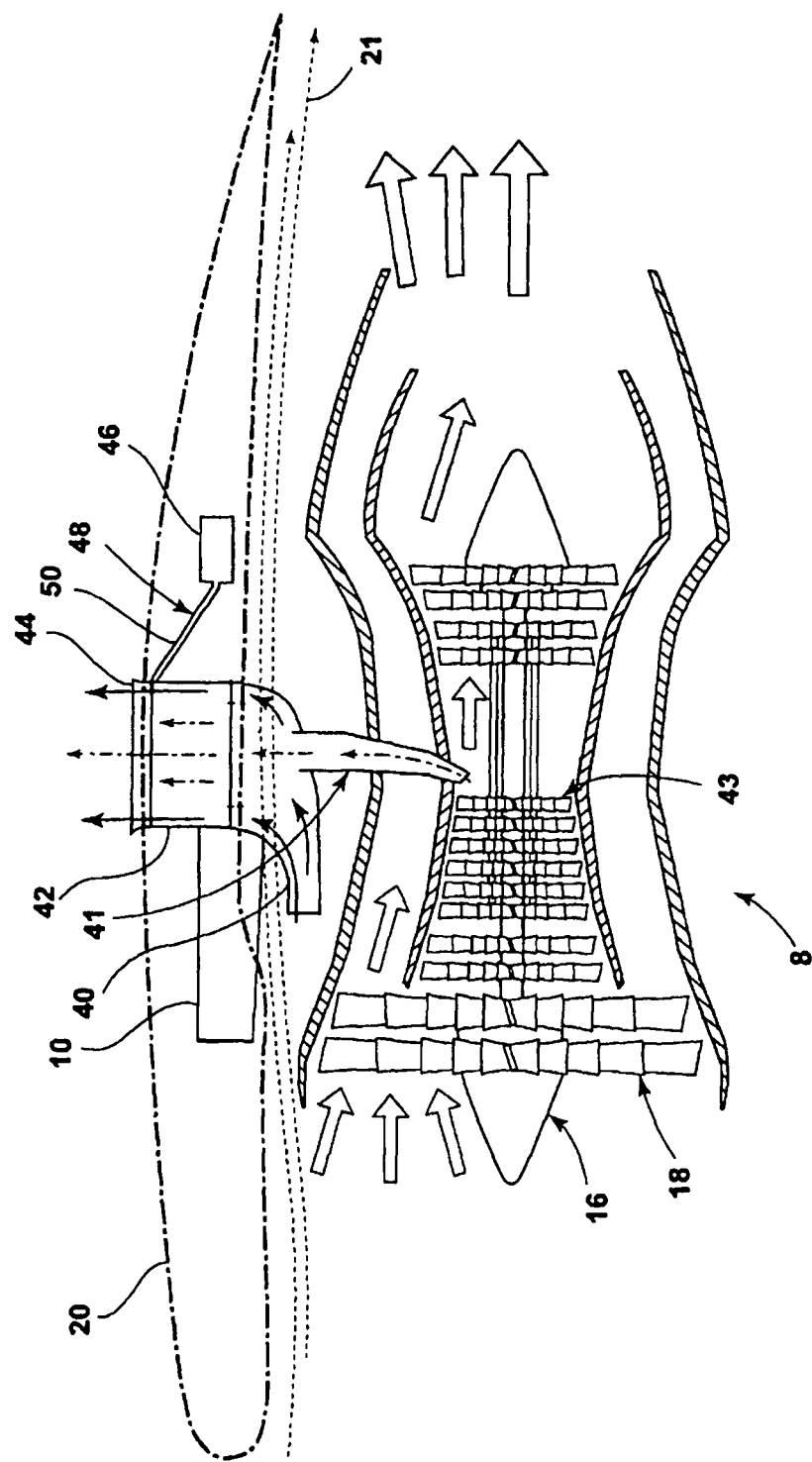
FIG. 3 is a schematic view of a portion of a turbofan jet engine assembly, which may be included in the aircraft of FIG. 1.

FIG. 3 illustrates a portion of the turbofan jet engine assembly 8 with the nacelle 20 drawn in phantom. A scoop 40 may be located within the path of the bypass airflow illustrated with arrows 21. The scoop 40 may be positioned such that a portion of the bypass airflow, illustrated with arrows 21, moving through the turbofan jet engine assembly 8 will be diverted into the scoop 40. A bleed air system 41 may include a pre-cooler 42 fluidly coupled to at least one compressor 43 of the turbine engine 8 to bleed air from the at least one compressor 43 and cool the bleed air. It will be understood that the turbine engine 8 may have several compressors including a high-pressure compressor and a low-pressure compressor and that the pre-cooler 42 may be fluidly coupled to multiple compressors. For example, the pre-cooler 42 may be fluidly coupled to both the low-pressure compressor and the high-pressure compressor of the turbine engine. In such an instance, the bleed air from low-pressure compressor may be used to cool the bleed air from the high-pressure compressor.

This bleed air is typically of a high temperature and pressure and must be cooled prior to use in other systems of the aircraft 2. The pre-cooler 42 may act as part of the heat exchanger used to cool the bleed air prior to its use. The pre-cooler 42 may be operably coupled to the scoop 40 such that the portion of the bypass airflow that is diverted into the scoop 40 travels to the pre-cooler 42. This bypass air from the scoop 40 may be used to cool the bleed air by blowing the air through the pre-cooler 42. After passing through the pre-cooler 42, the bypass air may be vented through the pre-cooler exhaust 44.

A thrust reverser locking system 46 may operably couple to the thrust reverser 22 and may be configured to selectively lock the thrust reverser 22 into position by engaging a hook or some other means of securing the thrust reverser 22 in place. When unlocked, the thrust reverser locking system 46 may use a hydraulic or electro-mechanical actuator to move the thrust reverser 22 back into a position for the hook or other arresting device to engage. It is understood that the operation of the thrust reverser locking system 46 may be dependent upon the type of thrust reverser used and as such may take a variety of forms. The thrust reverser locking system 46 may be mounted on the pylon 10 and may be exposed to hot ambient air, which may cause failure or degradation of performance of the thrust reverser locking system 46. On a day with an ambient temperature of greater than 35 degrees Celsius, fan air temperature including the bypass airflow path may be approximately 80 degrees Celsius. The pylon 10, which is additionally heated by the turbofan jet engine assembly 8, may reach a temperature in excess of 110 degrees Celsius. This temperature may exceed the operational requirements for the thrust reverser locking system 46.

Figure 4:
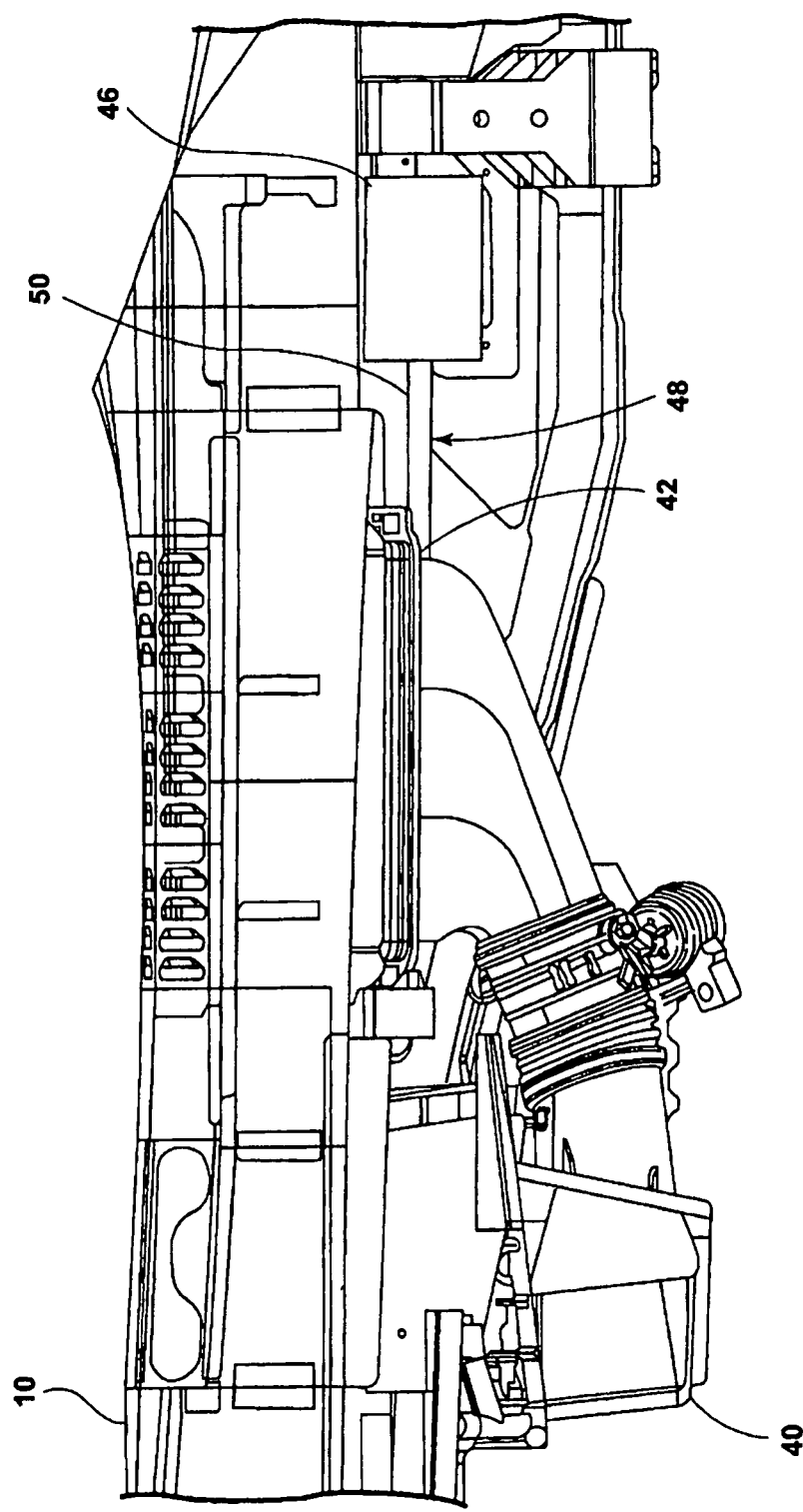
FIG. 4 is a perspective view of a locking system, bleed air system, and injection cooling system, which may be included in the aircraft of FIG. 1.

A cooling system 48 may be coupled to the thrust reverser locking system 46 and may be used to lower the temperature of the thrust reverser locking system 46. More specifically, the cooling system 48 may be an injection cooling system, which may be fluidly coupled to the thrust reverser locking system 46 and the pre-cooler 42 and may be configured to transfer hot ambient air from the thrust reverser locking system 46 to the pre-cooler 42. FIG. 4 provides an exemplary perspective view of the thrust reverser locking system 46, injection cooling system 48, and pre-cooler 42 to aid in visualizing the cooling system 48. For example, the injection cooling system 48 may include an air supply duct 50 fluidly coupling the thrust reverser locking system 46 and the pre-cooler 42. The air supply duct 50 may be configured to supply hot ambient air from the thrust reverser locking system 46 to the pre-cooler 42. The air supply duct 50 may take any suitable form and shape.

Figure 5:
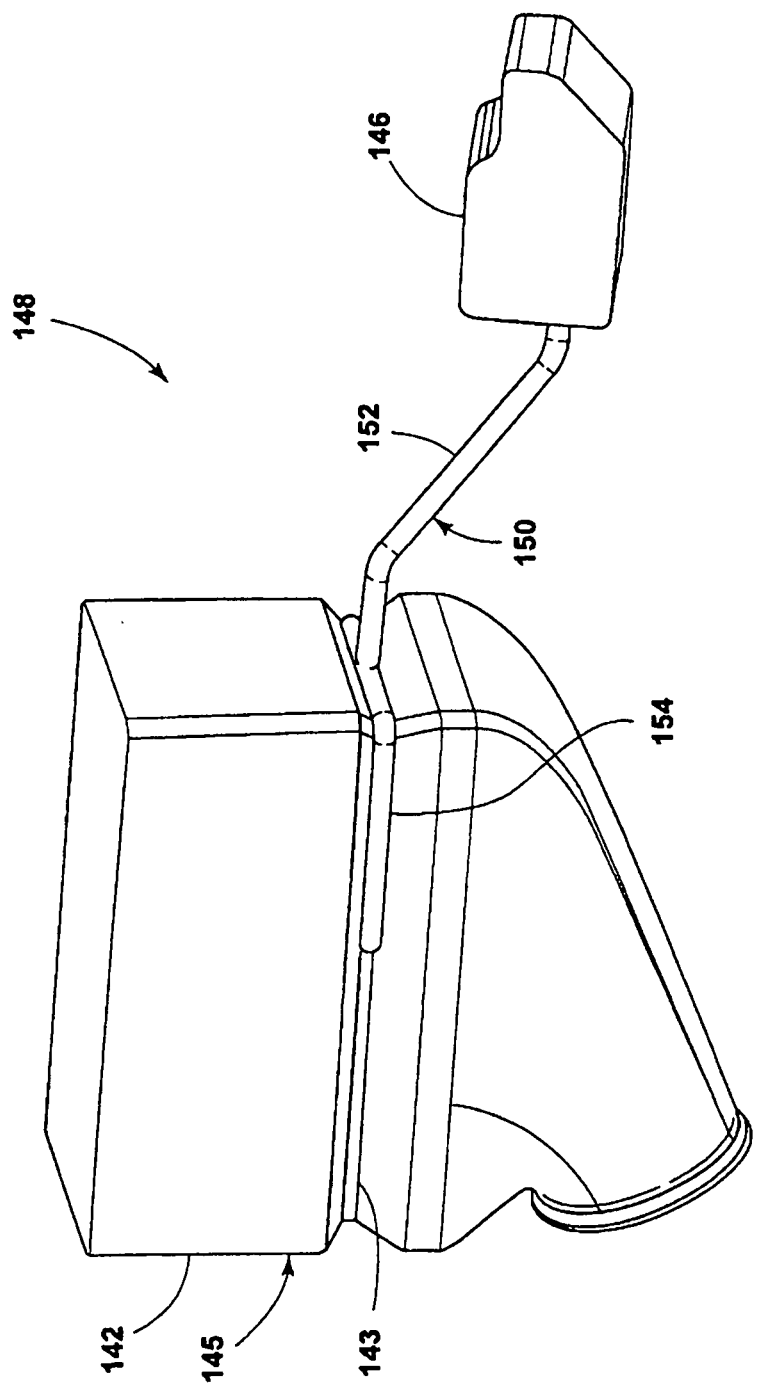
FIG. 5 is a perspective view of examples of a pre-cooler and an injection cooling system.

It is contemplated that the pre-cooler 42, thrust reverser locking system 46, and injection cooling system 48 may be of various designs, shapes, and locations. For example, FIG. 5 illustrates an alternative pre-cooler 142, thrust reverser locking system 146, and injection cooling system 148, which are similar to those previously described and therefore, like parts will be identified with like numerals increased by 100, with it being understood that the description of the like parts applies to the pre-cooler 142, thrust reverser locking system 146, and injection cooling system 148 unless otherwise noted. As illustrated, the air supply duct 150 may include an injection tube 152. An exterior of the pre-cooler 142 may be mounted to the injection tube 152 in any suitable manner including that fasteners may be utilized to attach the injection tube 152 to the exterior 145 of the pre-cooler 142. The injection tube 152 may have an interface portion 154 that fluidly couples with the pre-cooler 142 to establish airflow communication from the injection tube 152 to the pre-cooler 142 and to decrease the temperature of the thrust reverser locking system 46 to within operational parameters. The pre-cooler 142 may utilize a convergent-divergent nozzle shape to create a local low-pressure area to ensure air is only transferred in a direction from the thrust reverser locking system 146 to the pre-cooler 142. In a convergent-divergent nozzle, the expansion of gas causes pressure to drop near the divergent duct. This pressure may be lower than that of the thrust reverser locking system 146 and therefore prohibit upstream travel.

The exterior 145 of the pre-cooler 142 may be shaped with an indentation 143 that may receive a portion of the injection tube 152. More specifically, in the illustrated example, the indentation has been illustrated as receiving the interface portion 154. This may aid in holding the interface portion 154 in place such that a fluid communication may be formed between the pre-cooler 142 and the injection cooling system 148. It is also contemplated that the interface portion 154 may be operably coupled to the pre-cooler 142 in any suitable manner such that the fluid communication between the pre-cooler 142 and the injection cooling system 148 is established and air may flow from the injection tube 152 to the pre-cooler 142. FIG. 6A more clearly illustrates that the injection tube 152 may have corresponding openings 156 to establish airflow from the injection tube 152 into the pre-cooler 142. It will be understood that any number of openings may be included and that the size and shape of the openings may be formed in any manner. It is contemplated that the interface portion 154 and the pre-cooler 142 may have corresponding openings to establish airflow from the injection tube 152 into the pre-cooler 142. While openings within the pre-cooler 142 have not been illustrated it will be understood that the pre-cooler 142 may also have a suitable opening(s) for allowing fluid to enter therein.

FIG. 6B illustrates an alternative injection tube 252, which is similar to the injection tube 152 previously described and therefore, like parts will be identified with like numerals increased by 100, with it being understood that the description of the like parts applies to the injection tube 252 unless otherwise noted. The injection tube 252 as illustrated does not wrap around the sides of the pre-cooler 142 and only interfaces with one side of the pre-cooler 142. It will be understood that the interface portion 254 may wrap around any suitable portion of the pre-cooler 142, including that the interface portion 254 may encircle the pre-cooler 142 entirely. For example, FIG. 6C illustrates an alternative injection tube 352, which is similar to the injection tube 152 previously described and therefore, like parts will be identified with like numerals increased by 200, with it being understood that the description of the like parts applies to the injection tube 352 unless otherwise noted. The interface portion 354 of the injection tube 352 may wrap around an entirety of the pre-cooler 142. In this manner, fluid communication may be established with all sides of the pre-cooler 142. Alternatively, even though the injection tube 352 wraps around the pre-cooler 142 only a portion may be in fluid communication with the pre-cooler 142.

The embodiments described above provide for a variety of benefits including that the thrust reverser locking system may be efficiently and effectively cooled. The thrust reverser locking system may otherwise exceed the working temperature limit of the thrust reverser locking system. The embodiments add very limited weight and are capable of meeting clearance requirements of a small pylon system. The embodiments described above allow for cooling of the locking system with no possibility of reverse airflow.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the innovation, including the best mode, and also to enable any person skilled in the art to practice the innovation, including making and using any devices or systems and performing any incorporated methods. The patentable scope of the innovation is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An aircraft, comprising:
    a turbofan engine assembly, comprising:
        a turbine engine having at least one compressor; a nacelle surrounding the turbine engine and defining an annular bypass duct between the nacelle and the turbine engine and extending through the turbofan engine assembly to define a generally forward-to-aft bypass airflow path,
        a thrust reverser having at least one movable control surface, movable to and from a reversing position where at least a portion of the bypass airflow is at least partially reversed, the thrust reverser is located within the nacelle, and
        a thrust reverser locking system operably coupled to the thrust reverser and configured to selectively lock the thrust reverser,
    a bleed air system having a pre-cooler fluidly coupled to the at least one compressor of the turbine engine to bleed air from the at least one compressor and cool the bleed air, and
    an injection cooling system fluidly coupled to the thrust reverser locking system and the pre-cooler and configured to transfer hot ambient air from the thrust reverser locking system to the pre-cooler.

2. The aircraft of claim 1 wherein the injection cooling system comprises an air supply duct fluidly coupling the thrust reverser locking system and the pre-cooler and configured to supply hot ambient air from the thrust reverser locking system to the pre-cooler.

3. The aircraft of claim 2 wherein the air supply duct comprises an injection tube used to supply hot ambient air from the thrust reverser locking system to the pre-cooler.

4. The aircraft of claim 3 wherein an exterior of the pre-cooler is mounted to the injection tube.

5. The aircraft of claim 4 wherein the exterior of the pre-cooler comprises an indentation that receives a portion of the injection tube.

6. The aircraft of claim 3 wherein the injection tube has an interface portion that fluidly couples with the pre-cooler to establish airflow communication from the injection tube to the pre-cooler.

7. The aircraft of claim 6 wherein the interface portion and the pre-cooler have corresponding openings to establish airflow from the injection tube into the pre-cooler.

8. The aircraft of claim 6 wherein the interface portion wraps around at least a portion of an exterior of the pre-cooler.

9. The aircraft of claim 1 wherein air is only transferred in a direction from the thrust reverser locking system to the pre-cooler.

10. The aircraft of claim 1, further comprising a pylon configured for securing the engine assembly to a portion of an aircraft and wherein the thrust reverser locking system is mounted on the pylon.

11. An injection cooling system for cooling a thrust reverser locking system of a jet engine assembly in an aircraft having a bleed air system having a pre-cooler fluidly coupled the jet engine assembly to bleed air from the jet engine and cool the bleed air, comprising:
    an air supply duct fluidly coupling the thrust reverser locking system to the pre-cooler and configured to supply hot ambient air from the thrust reverser locking system to the pre-cooler to cool the thrust reverser locking system, and the thrust reverser locking system is located within a nacelle of the jet engine.

12. The injection cooling system of claim 11 wherein the air supply duct comprises an injection tube having an interface portion that fluidly couples with the pre-cooler to establish airflow communication from the injection tube to the pre-cooler.

13. The injection cooling system of claim 12 wherein the interface portion wraps around an exterior portion of the pre-cooler.

14. The injection cooling system of claim 13 wherein the interface portion encircles the pre-cooler.

15. The injection cooling system of claim 11 wherein air is only transferred in a direction from the thrust referser locking system to the pre-cooler.

* * * * *